Nov. 14, 1933.　　　　F. M. REED　　　　1,935,281
HEAT EXCHANGE MECHANISM
Filed June 3, 1931
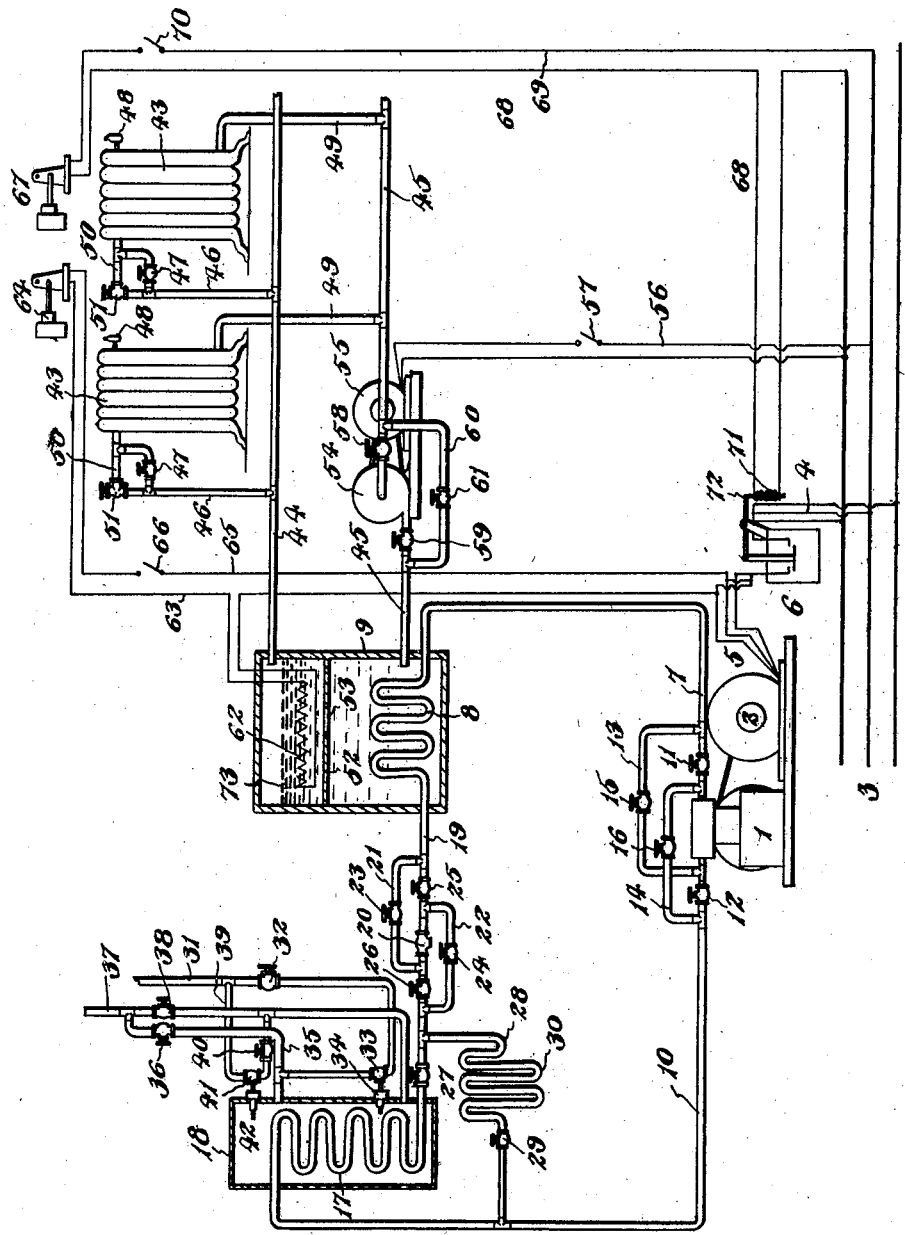
Inventor
F. M. Reed
By Lacey & Lacey,
Attorneys Patented Nov. 14, 1933

1,935,281

UNITED STATES PATENT OFFICE 1,935,281

HEAT-EXCHANGE MECHANISM

Frank Maynard Reed, Clearfield, Pa.

Application June 3, 1931. Serial No. 541,871

1 Claim. (Cl. 62—115)

This invention relates to heat-exchange mechanism and has for its object the provision of means whereby the temperature in a room or building may be maintained substantially uniform and at a desired degree. The invention provides means whereby the capacity of a fluid to absorb heat from surrounding objects or materials and to liberate heat when expanded may be utilized to either reduce or increase the temperature of a building or room. The invention is illustrated in the accompanying drawing and will be hereinafter first fully described and then more particularly defined in the appended claim.

The annexed drawing is a diagrammatic illustration of an apparatus embodying the invention.

In the drawing, the reference numeral 1 indicates a compressor which is operated by an electric motor 2, the current to which is supplied from trunk lines through branch conductors 4 and 5 and controlled by a switch 6. From the high pressure side of the compressor 1, a pipe 7 leads to a coil 8 within a tank 9, and a return pipe 10 leads into the low pressure side of the compressor. At the opposite sides of the compressor, cut-off valves 11 and 12 are interposed in the pipes 7 and 10 respectively, and there are also provided by-pass pipes 13 and 14. One end of the pipe 13 is connected to the pipe 10 between the compressor and the valve 12, and the opposite end of said pipe 13 is connected to the pipe 7 beyond the valve 11, a cut-off valve 15 being provided in the pipe 13, as indicated. One end of the pipe 14 is connected to the pipe 7 between the compressor and the valve 11, while the opposite end of said pipe 14 is connected to the pipe 10 in advance of the valve 12, a cut-off valve 16 being provided in said pipe 14, as indicated. The pipe 7 merges into the coil 8 within the tank 9, as indicated and as previously suggested, and the pipe 10 leads from a coil 17 disposed within a second tank 18, as indicated. A pipe 19 extends between the tanks 9 and 18 and connects the coils 8 and 17, as indicated in the drawing, an expansion valve 20 being interposed in said pipe 19 between the tanks, as will be understood. By-pass pipes 21 and 22 are provided and are equipped with cut-off valves 23 and 24 respectively, while cut-off valves 25 and 26 are provided in the pipe 19 at opposite sides of the expansion valve 20. One end of the pipe 21 is connected to the pipe 19 between the tank 10 and the valve 25, while the opposite end of said pipe 21 is connected to the pipe 19 between the expansion valve and the valve 26. One end of the pipe 22 is connected to the pipe 19 between the cut-off valve 25 and the expansion valve 20, while the opposite end of said pipe 22 is connected to the pipe 19 between the valve 26 and the tank 18. A cut-off valve 27 is fitted in the pipe 19 adjacent the tank 18, and a by-pass pipe 28 is connected at one end with the pipe 19 between the pipe 22 and the valve 27, while the opposite end of said pipe 28 is connected to the pipe 10, as indicated. A cut-off valve 29 is provided in the pipe 28 and, between said valve 29 and the pipe 19, the pipe 28 is formed into a coil 30, which coil may be located outside the building where it will be exposed to the outside air.

Water may be supplied to the tank 18 through a pipe 31 leading from the building supply or circulating system and equipped with a cut-off valve 32. This pipe 31 extends to a point near the bottom of the tank 18 where it is equipped with a valve 33 controlled by a thermostat 34, and then passes upwardly to a point near the top of the tank 18 where it is connected to a pipe 35 having one end entering the tank 18, as indicated, and having its greater portion extending upwardly and provided with a cut-off valve 36. Said pipe 35, above the valve 36, is connected with an outlet pipe 37 leading to a drain or other point of discharge and communicating with the tank 18 near the bottom thereof, as indicated in the drawing. Near the junction of the pipes 35 and 37, a cut-off valve 38 is provided in the pipe 37. A branch pipe 39 is also connected with the supply pipe 31 at one end and has its opposite end connected with the pipe 37, a cut-off valve 40 being provided in the pipe 39 and also a valve 41 which is controlled by a thermostat 42 having its actuating member disposed within the tank 18 near the top thereof.

The tank 9 is connected with the heating system of the building, represented by the radiators 43, through the circulating pipes 44 and 45, the pipe 44 leading from the top of the tank, and the return pipe 45 communicating with the lower portion of the tank. Branch pipes 46 lead from the pipe 44 to the respective radiators and are equipped with cut-off valves 47 in the usual manner, while the radiators are equipped with the usual vent valves 48. The return pipe 45 is connected with the discharge side of the radiators through branch pipes 49, and the radiators are also illustrated as connected with the inlet pipes 46 through by-pass pipes 50 equipped with vacuum valves 51. The tank 9 has a horizontal partition 52 therein through which is a small opening 53 whereby the flow of water upwardly in the tank will be retarded. A circulating pump 54 is interposed in the return pipe 45 and driven by a small motor 55, current to which is supplied from the trunk lines 3 through branch conductors 56 in which is interposed a hand-operated switch 57 of any approved form. A cut-off valve 58 is mounted in the pipe 45 at the inlet side of the pump 54, and a second cut-off valve 59 is mounted in said pipe at the outlet side of the pump. A by-pass pipe 60 is provided and has its ends connected to the pipe 45, the valves 58 and 59 being located between the ends of the by-pass pipe, and a cut-off valve 61 is provided in the by-pass pipe.

In the upper portion of the tank 9, above the partition 52, is a resistance coil 62 which is utilized as an auxiliary heater, the ends of this coil being connected to a conductor 63 which forms part of the circuit of an electrically operated thermostatic switch 64 located at any preferred point in the room or building which is to be heated or cooled. The conductors 63 and 65, connected with opposite sides of the thermostatic switch, are connected with the branch conductors 5, and a hand switch 66 may be interposed therein, as indicated. There is also provided a second thermostatic switch 67, the conductors 68 and 69 for said switch being connected with the trunk lines 3, as indicated, and a hand switch 70 being interposed in one of the conductors 68 or 69. One of these branch conductors leads to a coil 71 which constitutes the energizing element of a solenoid 72 which controls the switch 6.

The pipes 7 and 10 with the coils 8 and 17, together with the several by-pass pipes connected therewith, are filled with some suitable fluid, such as anhydrous ammonia, sulphur dioxide, methyl chloride, ethyl chloride or carbon dioxide, and the water in the tank 9 will be raised or lowered in temperature accordingly as the fluid is caused to flow in one or the other direction through manipulation of the several cut-off valves, as will be explained. The heating system may be either a hot water system or a vacuum vapor system. With a hot water system, the tank 9 and the entire heating system is filled with water, the inlet to the radiators being controlled by the cut-off valves 47, and the discharge being through the pipe 45 back to the tank. If necessary, the pump 54 is employed to aid circulation, but if the operation of this pump is unnecessary, the water is by-passed around the pump by closing the valves 58 and 59 and opening the valve 61. If the vacuum system is used, the tank C is filled to the level indicated by the dotted line 73, and the circulating pump 54 is by-passed as just described. The cut-off valves 47 are closed and the vapor valves 51 are opened.

If it be desired to heat the water in the tank 9, the valves 15, 16, 23 and 24 are closed and the valves 11, 12, 25 and 26 are opened. The compressor, then being set in operation, will compress the fluid therein and drive it from the high pressure side through the pipe 7 to the coil 8 in the tank 9, which may be heat-insulated if so desired. The heat stored in the fluid by compression will be given off through the coil 8 to the water within the tank 9 so that the water will be raised in temperature and will rise to the radiators and circulate through the heating system. From the coil 8, the fluid will pass through the pipe 19 and expansion valve 20 and, after passing the valve 20, it will expand and be partly vaporized and further reduced in temperature. The fluid then passes to the coil 17 within the tank 18 and absorbs heat from the water circulating in said tank, after which it passes through the pipe 10 to the low pressure side of the compressor 1 and the cycle of operation is repeated. The resistance coil 62 constitutes an auxiliary heater so that the temperature of the water in the tank 9 will be very quickly raised to the desired degree and, while retaining the high temperature, will circulate through the heating system. As the water reaches the boiling point, steam will be forced into the radiators and air will be forced out through the vent valves 48. When the temperature of the building reaches a predetermined point, the thermostatic switch 64 will be opened, thereby cutting out the resistance coil 62, and thereafter, the coil 8 will maintain or increase the heat of the system until the temperature reaches a somewhat higher predetermined point, whereupon the thermostatic switch 67 will be opened so that the coil 71 will be de-energized and the switch 6 will be opened to cut out the motor 2 and stop the operation of the compressor. When the temperature drops to a point determined upon for the operation of the switch 67, said switch will be closed and the switch 6 will again, in its turn, be closed, so that the motor will again drive the compressor and the circulation and compression of the gas or fluid will be reinstated. Should the temperature continue to drop, the switch 64 will be automatically closed and the resistance coil or auxiliary heater 62 will be again energized so that the water in the tank 9 will be quickly heated. When the temperature falls, a vacuum will be created in the system due to condensation of the steam, inasmuch as the air in the heating system has been driven out through the valves 48. Consequently, the water will vaporize at a lower temperature after the initial operation.

If the mechanism is to be used to reduce the temperature in the building, the valves 15, 16, 23 and 24 will be opened, and valves 11, 12, 25 and 26 will be closed. Then, when the compressor is operating, the fluid will pass from the high pressure side of the compressor through the pipe 14 to the pipe 10, and thence through the coil 17 to the by-pass pipe 22, giving up heat to the circulating water in the tank 18. From the by-pass pipe 22, the fluid enters the pipe 19 adjacent the expansion valve 20 and flows through the expansion valve into the by-pass pipe 21 whence it passes into the pipe 19 and thence to the coil 8. From the coil 8, the fluid passes through the pipe 7 to the by-pass pipe 13 and thence to the low pressure side of the compressor. When the fluid passes the expansion valve 20, it is further vaporized and reduced in temperature so that when it enters the tank 9 it will rapidly absorb heat from the water in said tank, returning to the compressor at a very low temperature to repeat the cycle of operation. When the apparatus is used as a cooling system, the radiators and the tank will be completely filled with water or other liquid and the circuit to the resistance 62 will be opened, while the thermostat 67 will be reversed and reset so that it will open the compressor motor circuit at some predetermined degree below the normal room temperature. If preferred, the magnetizing coil 71 may be cut out and the switch 6 operated by hand. The by-pass valve 61 may be closed, and the valves 58 and 59 opened so that the operation of the circulating pump 54 will cause circulation of cold water or liquid from the tank 9 through the radiators and the circulating pipes.

When the mechanism is used as a heating apparatus, the coil 17 in the tank 18 must absorb heat from the circulating water in said tank. The circulating water is made to enter the upper part of the tank 18 by opening the valve 32 and closing the valve 40, so that the water will enter the tank through the end of the pipe 35 and pass therefrom at the bottom thereof through the pipe 37, the valve 38 being opened and the valve 36 closed. The flow is controlled by the thermostatic valve 33 which opens as the temperature of the water falls and closes as the temperature rises within predetermined limits. The described direction of flow will give the most efficient interchange of heat between the coil and the circulating water. When the temperature of the outside air permits the use of the by-pass coil 30, the valve 27 may be closed and the valve 29 opened, so that the fluid from the compressor will not flow through the coil 17 but will pass through the coil 30 and will thus save the use of the building water supply.

From the foregoing description, taken in connection with the accompanying drawing, it will be seen that I have provided an exceedingly simple apparatus which will operate efficiently to maintain the temperature of a room or building at a desired degree.

Having thus described the invention, I claim:

In apparatus for the purpose set forth, a liquid-containing tank, a coil in said tank, a second tank, a supply pipe having an upstanding terminal portion communicating with the second tank near the upper end of the latter, a cut-off valve in said terminal portion at the lower end thereof responsive to temperature changes in the lower portion of said tank, a draw-off pipe extending from the lower end of said tank, a branch pipe connecting the supply pipe with the draw-off pipe, regulating valves in the supply pipe and said branch pipe below the junction of said pipes, a cut-off valve in said branch pipe responsive to temperature changes in the upper portion of the tank, a branch pipe leading from the terminal portion of the supply pipe and connected to the draw-off pipe, regulating valves in said branch pipe and the draw-off pipe below the junction of said pipes, a coil in the second tank, a pipe connecting the two coils, an expansion valve in said pipe, by-pass pipes connected with said pipe on opposite sides of the expansion valve, a compressor, pipes connecting the coils with opposite sides of the compressor, and by-pass pipes connected with the last-mentioned pipes at opposite sides of the compressor whereby the fluid may be caused to flow in one or the opposite direction.

FRANK MAYNARD REED. [L. S.]